US009860410B2

(12) United States Patent
Hamaguchi (10) Patent No.: US 9,860,410 B2
(45) Date of Patent: Jan. 2, 2018

(54) IMAGE READING APPARATUS (71) Applicant: BROTHER KOGYO KABUSHIKI KAISHA, Nagoya-shi, Aichi-ken (JP)

(72) Inventor: Masanori Hamaguchi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/416,772

(22) Filed: Jan. 26, 2017

(65) Prior Publication Data
US 2017/0223214 A1 Aug. 3, 2017

(30) Foreign Application Priority Data
Jan. 29, 2016 (JP) ................. 2016-016180

(51) Int. Cl.
H04N 1/04 (2006.01)
H04N 1/10 (2006.01)
H04N 1/00 (2006.01)

(52) U.S. Cl.
CPC ....... *H04N 1/1043* (2013.01); *H04N 1/00588* (2013.01); *H04N 1/1026* (2013.01); *H04N 2201/0081* (2013.01)

(58) Field of Classification Search
CPC ........... H04N 1/00546; H04N 1/00551; H04N 1/00559; H04N 1/00599; H04N 1/00679; H04N 2201/02489; H04N 2201/02495; H04N 1/00535; H04N 1/00554
USPC ......... 358/498, 474; 399/110, 111, 117, 125, 399/262, 367, 405
See application file for complete search history.

(56) References Cited

U.S. PATENT DOCUMENTS

| 7,778,572 B2 * | 8/2010 | Iijima | G03G 21/1628 347/108 |
| 8,454,123 B2 * | 6/2013 | Ogawa | B41J 23/025 347/37 |
| 8,964,263 B1 * | 2/2015 | Sakakibara | H04N 1/00535 358/474 |
| 9,278,819 B2 * | 3/2016 | Doshida | B65H 1/04 |
| 9,363,396 B2 * | 6/2016 | Sakakibara | H04N 1/00559 |
| 9,386,176 B2 * | 7/2016 | Iida | B26D 1/045 |
| 9,630,793 B2 * | 4/2017 | Kozaki | B65H 5/36 |

FOREIGN PATENT DOCUMENTS

JP 2013-115759 A 6/2013

* cited by examiner

Primary Examiner — Negussie Worku
(74) Attorney, Agent, or Firm — Merchant & Gould P.C.

(57) ABSTRACT

An image reading apparatus includes a document supporter, a guide, a carriage, and a reader. The carriage has a recessed portion. A first protrusion, a second protrusion, a third protrusion, a fourth protrusion, a fifth protrusion, and a sixth protrusion are provided on the recessed portion. Each of the first protrusion, the second protrusion, the third protrusion, and the fourth protrusion has a distal end portion in a protruding direction thereof, and the distal end portion is in contact with the guide when the carriage is mounted on the guide. A protruding amount of each of the fifth protrusion and the sixth protrusion in a protruding direction thereof is less than that of each of the first protrusion, the second protrusion, the third protrusion, and the fourth protrusion.

7 Claims, 11 Drawing Sheets

IMAGE READING APPARATUS

CROSS REFERENCE TO RELATED APPLICATION

The present application claims priority from Japanese Patent Application No. 2016-016180, which was filed on Jan. 29, 2016, the disclosure of which is herein incorporated by reference in its entirety.

BACKGROUND

The following disclosure relates to an image reading apparatus.

There is known an image reading apparatus of a flat-bed type. The image reading apparatus of this type includes: an image sensor having reading elements arranged in a main scanning direction; and a carriage on which the image sensor is mounted. The carriage is moved with the image sensor to move the image sensor in a sub-scanning direction. The carriage is movable along a guide extending in the sub-scanning direction.

The carriage has a recessed portion at its lower surface. This recessed portion is shaped such that its upwardly recessed portion extends in the sub-scanning direction. The carriage is mounted on the guide at this recessed portion. This construction enables the carriage to be moved along the guide in its longitudinal direction in a state in which the longitudinal direction of the carriage coincides with a direction orthogonal to the longitudinal direction of the guide.

SUMMARY

Incidentally, frictional resistance based on the area of contact between the recessed portion and the guide acts between the recessed portion and the guide during movement of the carriage along the guide. Thus, in case where the entire inner surface of the recessed portion is held in contact with the guide, the frictional resistance may become excessively large, leading to unsmooth movement of the carriage, for example.

To solve this problem, for example, protrusions may be provided on the inner surface of the recessed portion such that a distal end portion of each of the protrusions in a protruding direction contacts the guide. The area of contact between the guide and the protrusions in this construction is smaller than the area of contact between the guide and the entire inner surface of the recessed portion in the above-described construction. Accordingly, frictional resistance between the guide and the protrusions is smaller than the frictional resistance between the guide and the entire inner surface of the recessed portion.

Even in the case where the above-described protrusions are provided, the protrusions are worn over time, for example. If this wear causes the inner surface of the recessed portion to contact the guide, the frictional resistance becomes excessively large, leading to unsmooth movement of the carriage. In another case, positions of the respective protrusions may be changed due to deformation of the carriage over time, for example. If this deformation causes the inner surface of the recessed portion to contact the guide, the frictional resistance becomes excessively large, leading to unsmooth movement of the carriage.

Accordingly, an aspect of the disclosure relates to an image reading apparatus capable of keeping a state in which protrusions contact a guide even in the case where wear of the protrusions or deformation of a carriage is caused.

In one aspect of the disclosure, an image reading apparatus includes: a document supporter including a support surface parallel with a first direction and a second direction orthogonal to each other, the support surface being configured to support a document; a guide spaced apart from the document supporter and extending in the second direction; a carriage reciprocable in the second direction along the guide within an area extending from a first position to a second position; and a reader mounted on the carriage and movable in the second direction with the carriage, the reader including a plurality of reading elements arranged in the first direction, the plurality of reading elements being configured to read an image formed on the document supported on the document supporter during movement of the reader in the second direction. The carriage includes a recessed portion in which at least a portion of the guide is located when the carriage is mounted on the guide. A first protrusion and a second protrusion each protruding toward the guide are provided on a first end portion of opposite end portions of the recessed portion in the second direction. A third protrusion and a fourth protrusion each protruding toward the guide are provided on a second end portion of the opposite end portions in the second direction. A fifth protrusion protruding toward the guide is provided on the recessed portion at a position between the first protrusion and the third protrusion. A sixth protrusion protruding toward the guide is provided on the recessed portion at a position between the second protrusion and the fourth protrusion. Each of the first protrusion, the second protrusion, the third protrusion, and the fourth protrusion includes a distal end portion in a protruding direction thereof, and the distal end portion is in contact with the guide when the carriage is mounted on the guide. A protruding amount of each of the fifth protrusion and the sixth protrusion in a protruding direction thereof is less than that of each of the first protrusion, the second protrusion, the third protrusion, and the fourth protrusion.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Overall Configuration of MFP

Figure 1:
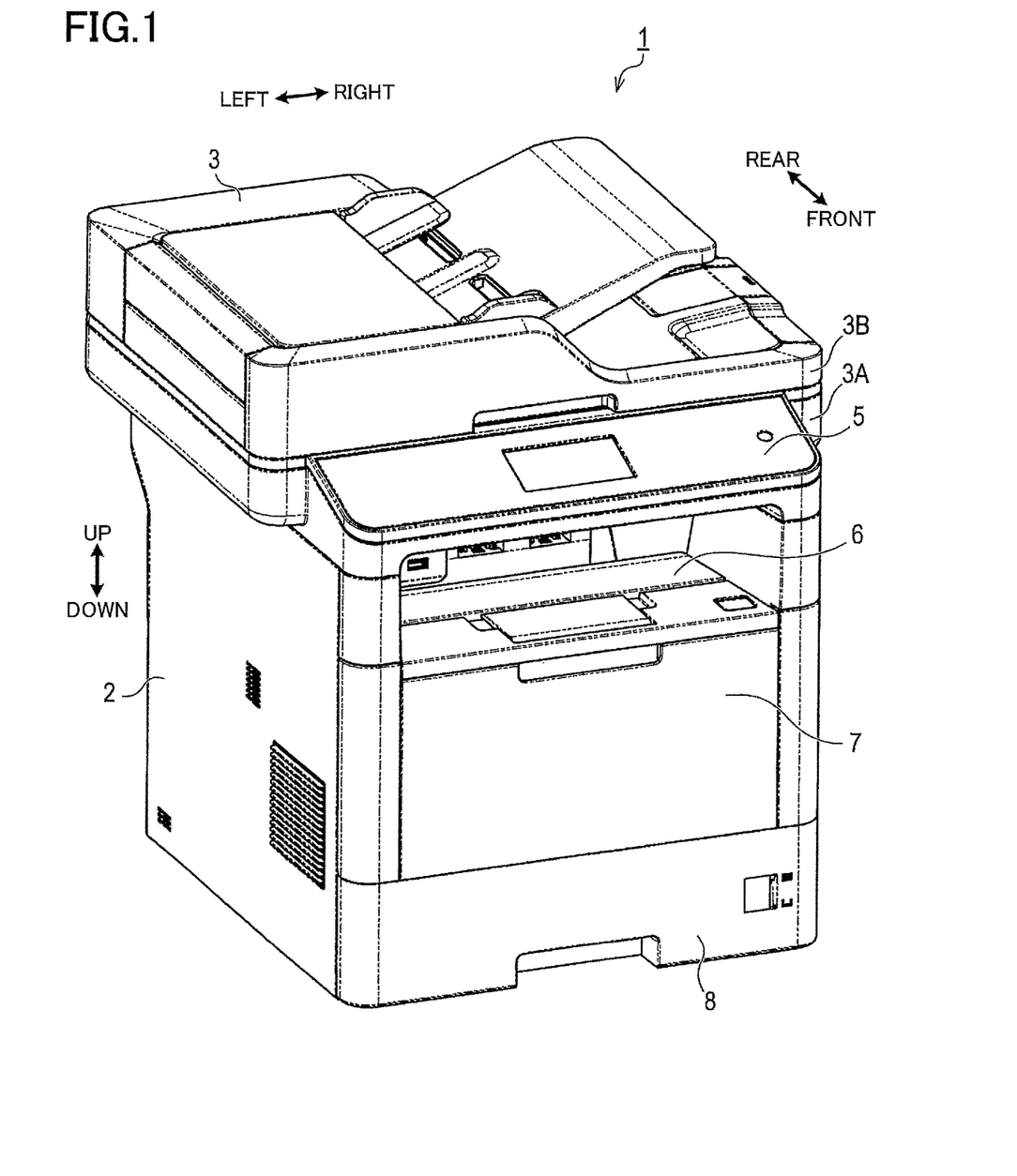
FIG. 1 is a perspective view illustrating an external appearance of a multi-function peripheral (MFP)

A multi-function peripheral (MFP) 1 illustrated in FIG. 1 has a configuration corresponding to one example of an image reading apparatus. In the following description and drawings, the up and down direction is a direction which is orthogonal to the horizontal plane in the case where the MFP 1 is placed on the horizontal plane. The front direction is a direction in which an operation panel 5, which will be described below, faces. The rear direction is opposite to the front direction. The right and left direction is a right and left direction in the case where the MFP 1 is viewed from a front side thereof. In the present embodiment, the front and rear direction is one example of a first direction. The right and left direction is one example of a second direction. The up and down direction is one example of a third direction.

As illustrated in FIG. 1, the MFP 1 includes a main body unit 2 and a reading unit 3 that is one example of an image reading apparatus. Devices provided in the main body unit 2 include: a controller for controlling the MFP 1; an image former; and a LAN communication device. The reading unit 3 includes a flat bed unit 3A (hereinafter referred to as "FB unit 3A") and an automatic document feeder 3B (hereinafter referred to as "ADF unit 3B"). The FB unit 3A and the ADF unit 3B will be described later in detail.

A front surface of the MFP 1 is provided with the operation panel 5 operable by a user. The operation panel 5 includes input devices and output devices. The input devices are used by the user for providing various instructions for the MFP 1. Examples of the input devices include a touch screen and various buttons and switches. The output devices notify the user of information such as an operating state of the MFP 1. Examples of the output devices include a liquid crystal display and various lamps.

A discharge tray 6 is provided below the operation panel 5. A recording medium on which an image had been formed by the image former is discharged onto the discharge tray 6. An openable front cover 7 is provided below the discharge tray 6. An open state of the front cover 7 enables the user to perform, for example, maintenance of the image former by accessing the image former provided in the main body unit 2. To form an image on a sheet such as a thick paper sheet or an envelope, the user may open the front cover 7 to use the front cover 7 as a medium supply tray. A supply cassette 8 is provided below the front cover 7. A recording medium to be supplied to the image former is stored in the supply cassette 8.

Reading Unit

There will be next explained a configuration of the reading unit 3. The reading unit 3 includes a first image sensor 11A and a second image sensor 11B. The first image sensor 11A is one example of a reader. The first image sensor 11A is provided on the FB unit 3A, and the second image sensor 11B is provided on the ADF unit 3B.

Each of the first image sensor 11A and the second image sensor 11B is a one-dimensional image sensor including a plurality of reading elements, not illustrated, arranged in one direction. In the present embodiment, each of the first image sensor 11A and the second image sensor 11B is a contact image sensor (CIS). The direction in which the reading elements of each of the first image sensor 11A and the second image sensor 11B are arranged may be hereinafter referred to as "main scanning direction". This main scanning direction is perpendicular to the right and left direction and the up and down direction in FIG. 2. That is, the main scanning direction coincides with the front and rear direction.

The reading unit 3 includes a flat bed (FB) platen 12, a first ADF platen 13A, and a second ADF platen 13B. The FB platen 12 is one example of a document supporter. The FB platen 12 and the first ADF platen 13A are provided in the FB unit 3A, and the second ADF platen 13B is provided in the ADF unit 3B. Each of the FB platen 12, the first ADF platen 13A, and the second ADF platen 13B is constituted by a transparent plate such as a glass plate and an acrylic plate, for example. The FB platen 12 is capable of supporting a document on its support surface parallel with the front and rear direction and the right and left direction orthogonal to each other.

The FB unit 3A includes a guide shaft 14, a carriage 15, and a toothed belt 16. The guide shaft 14 is one example of a guide. The guide shaft 14 is a metal round rod which is disposed under the FB platen 12, with a space therebetween. The guide shaft 14 extends in the right and left direction.

The carriage 15 is mounted and supported on the guide shaft 14 so as to be reciprocable in the right and left direction along the guide shaft 14. The carriage 15 is reciprocated in the right and left direction within a particular area. A left end and a right end of this area will be referred to as "first position" and "second position", respectively. That is, the carriage 15 is moved rightward from the first position to the second position and moved leftward from the second position to the first position.

The carriage 15 is coupled to the toothed belt 16 that is a looped endless belt. The toothed belt 16 is one example of a belt. The toothed belt 16 is rotated by a motor, not illustrated, in forward and reverse directions to reciprocate the carriage 15 in the right and left direction. The first image sensor 11A is mounted on the carriage 15 in a state in which the reading elements face toward the FB platen 12 and the first ADF platen 13A, that is, the reading elements face upward in FIG. 2.

The ADF unit 3B includes a holder 17 constituted by a resin foam layer and a hard resin film layer stacked on each other. When the ADF unit 3B is closed, the holder 17 is brought into close contact with the FB platen 12 with slight elastic deformation so as to press a reading object against the FB platen 12.

In the case where image reading is performed for the reading object, e.g., a sheet and a book, placed on an upper surface of the FB platen 12, the first image sensor 11A reads an image formed on the reading document while moving with the carriage 15 in a direction orthogonal to the main scanning direction in which the reading elements are arranged. The direction orthogonal to the main scanning direction may be hereinafter referred to as "sub-scanning direction". It is noted that the first image sensor 11A reads the image formed on the document supported on the FB platen 12, while the carriage 15 is being moved from the first position toward the second position.

Figure 2:
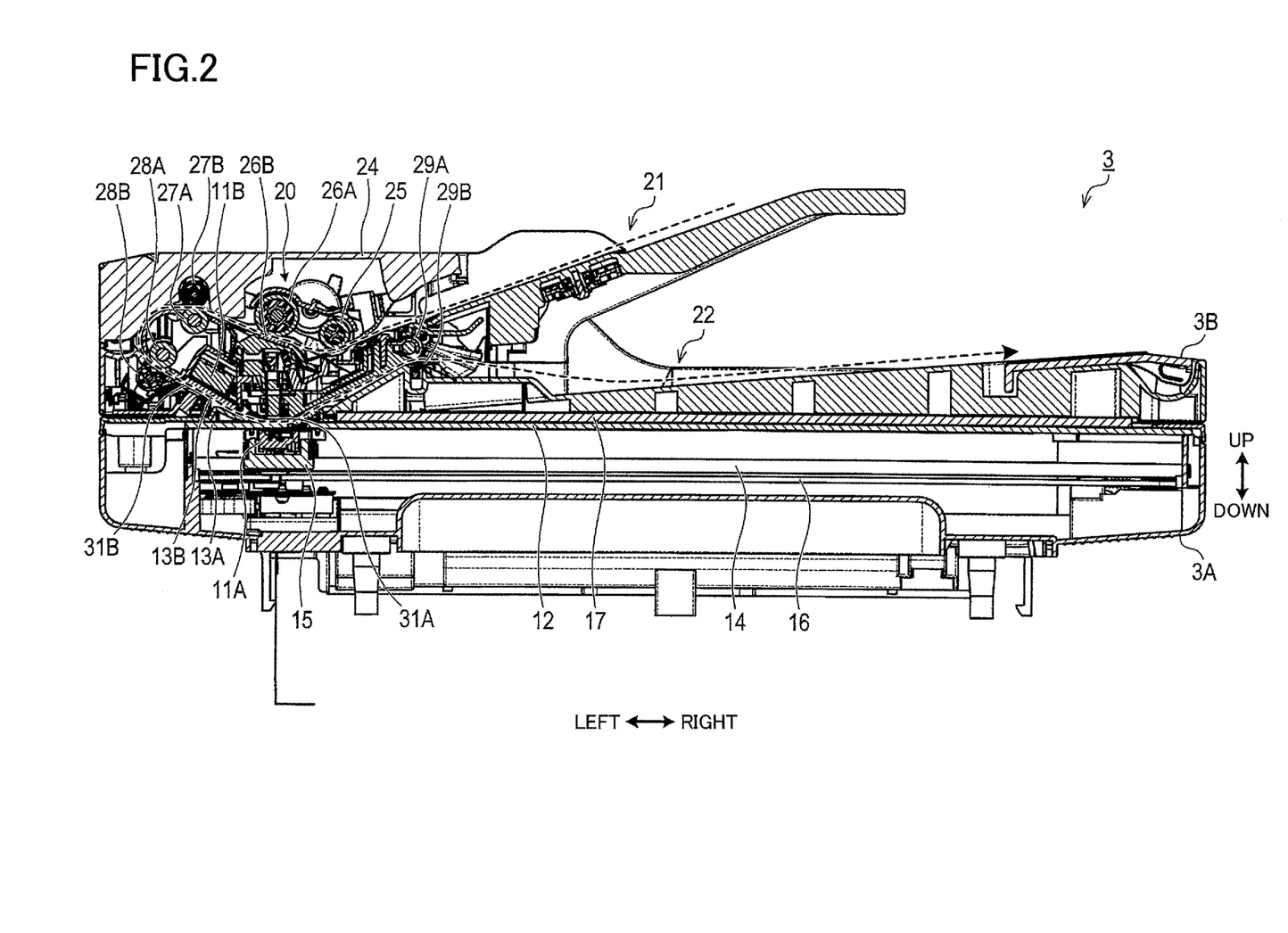
FIG. 2 is a cross-sectional view of a reading unit at its center in a front and rear direction.

As illustrated in FIG. 2, the ADF unit 3B of the reading unit 3 includes a conveyor 20 that conveys a sheet along a conveyance path indicated by the broken line in FIG. 2. A supply-sheet supporter 21 is provided upstream of the conveyor 20 in a conveying direction in which the sheet is to be conveyed. The supply-sheet supporter 21 supports the sheet to be supplied to the conveyor 20. A discharged-sheet supporter 22 is provided downstream of the conveyor 20 in the conveying direction. The discharged-sheet supporter 22 supports the sheet discharged from the conveyor 20.

The conveyor 20 includes a supply roller 25, a separating roller 26A, a separating piece 26B, a first conveying roller 27A, first pinch rollers 27B, a second conveying roller 28A, second pinch rollers 28B, a discharge roller 29A, and discharge pinch rollers 29B. The first pinch rollers 27B are urged toward the first conveying roller 27A by springs, not illustrated. The second pinch rollers 28B are urged toward the second conveying roller 28A by springs, not illustrated. The discharge pinch rollers 29B are urged toward the discharge roller 29A by springs, not illustrated.

The sheets placed on the supply-sheet supporter 21 are supplied from the supply-sheet supporter 21 toward a downstream side in the conveying direction by the supply roller 25 and separated from one another by the separating roller 26A and the separating piece 26B. The separated sheet is conveyed toward a downstream side in the conveying direction by the first conveying roller 27A and the second conveying roller 28A and discharged onto the discharged-sheet supporter 22 by the discharge roller 29A.

The first ADF platen 13A is provided at the lowermost portion of the conveyance path along the conveyance path. A first sheet presser 31A is provided above the first ADF platen 13A so as to be opposed to the first ADF platen 13A, with the conveyance path therebetween. The second ADF platen 13B is provided above a portion of the conveyance path which extends obliquely downward from the second conveying roller 28A toward the first ADF platen 13A along the conveyance path. A second sheet presser 31B is provided obliquely to the lower left of the second ADF platen 13B so as to be opposed to the second ADF platen 13B, with the conveyance path therebetween.

The first sheet presser 31A is urged toward the first ADF platen 13A by such an urging force that does not interfere with conveyance of the sheet. When the sheet is conveyed through an area between the first ADF platen 13A and the first sheet presser 31A, the first sheet presser 31A prevents the sheet conveyed while contacting an upper surface of the first ADF platen 13A, from floating from the first ADF platen 13A.

The second sheet presser 31B is urged toward the second ADF platen 13B by such an urging force that does not interfere with conveyance of the sheet. When the sheet is conveyed through an area between the second ADF platen 13B and the second sheet presser 31B, the second sheet presser 31B prevents the sheet conveyed while contacting an upper surface of the second ADF platen 13B, from floating from the second ADF platen 13B.

In the case where image reading is performed for the sheet conveyed by the conveyor 20, the first image sensor 11A is stopped so as to be opposed to the first sheet presser 31A with the first ADF platen 13A therebetween and reads the sheet conveyed while contacting the upper surface of the first ADF platen 13A. The second image sensor 11B is opposed to the second sheet presser 31B, with the second ADF platen 13B therebetween. The second image sensor 11B reads an image formed on the sheet conveyed while contacting a lower surface of the second ADF platen 13B.

First Image Sensor and Carriage

Figure 3:
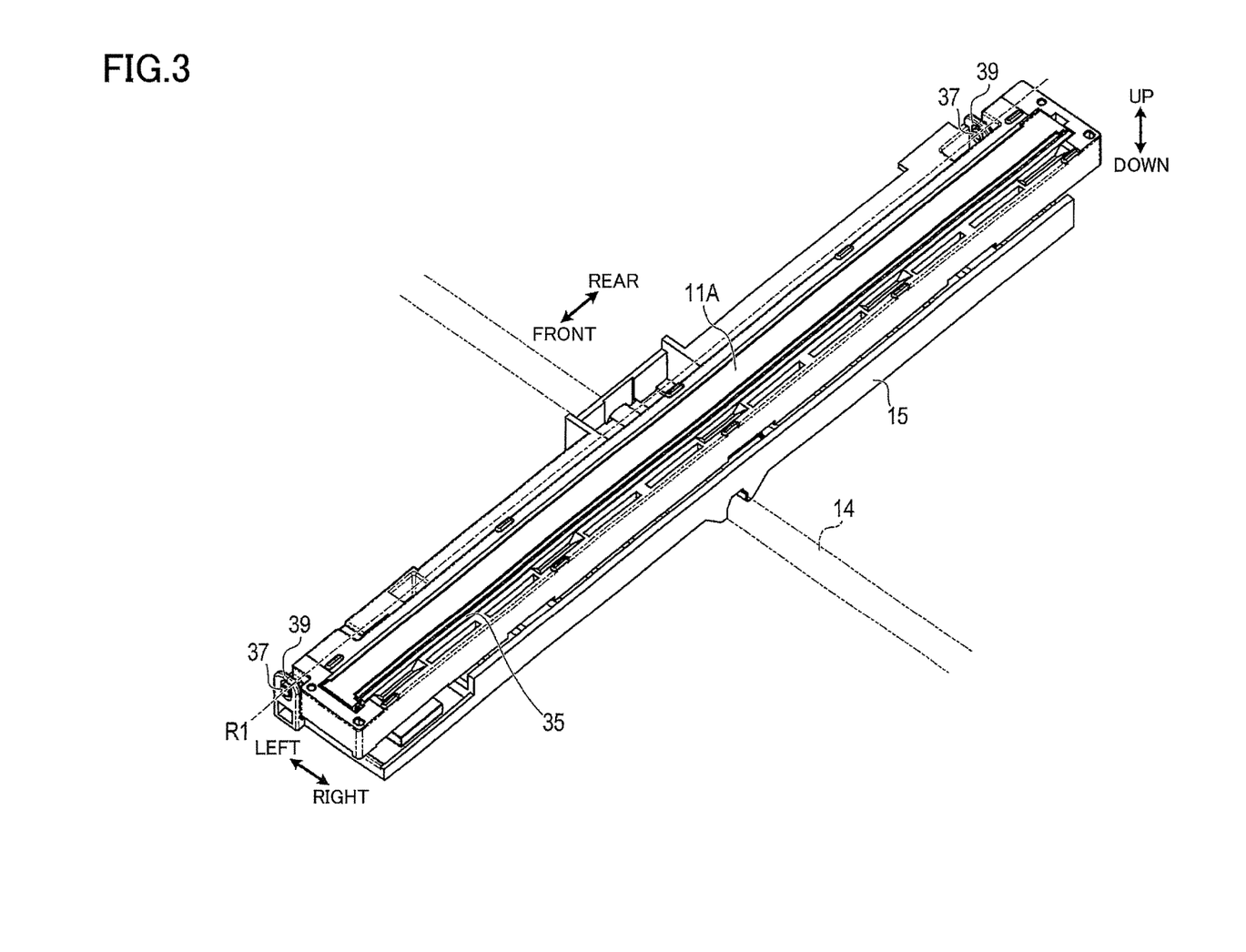
FIG. 3 is a perspective view of a first image sensor and a carriage in a first embodiment.

As illustrated in FIG. 3, the first image sensor 11A includes a light receiver 35 provided to the right of the center of the first image sensor 11A in the right and left direction. That is, the light receiver 35 is disposed nearer to the second position than to the first position. The reading elements are arranged just under this light receiver 35. The first image sensor 11A includes a support shaft 37 provided to the left of the center of the first image sensor 11A in the right and left direction. That is, the support shaft 37 is disposed nearer to the first position than to the second position. This support shaft 37 is supported by a bearing 39 provided on the carriage 15. Accordingly, the first image sensor 11A is supported by the carriage 15 at a position located to the left of the center of the first image sensor 11A in the right and left direction such that the first image sensor 11A is pivotable about an axis R1 extending in the front and rear direction.

Figure 4:
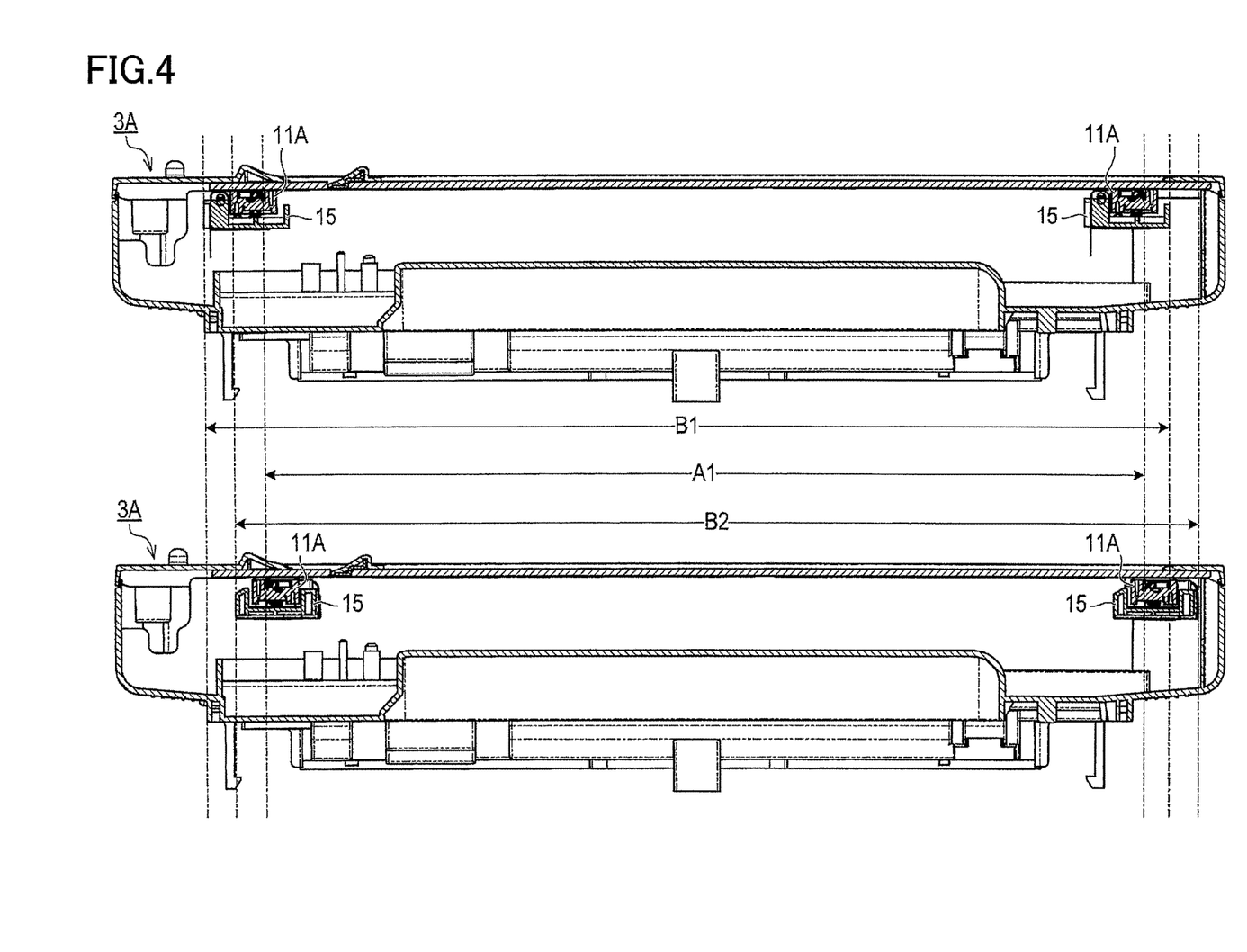
FIG. 4 is a view for explaining an area of movement of the carriage in the first embodiment.

The upper portion of FIG. 4 illustrates a construction in which the light receiver 35 is disposed to the right of the center of the first image sensor 11A in the right and left direction, and the support shaft 37 is disposed to the left of the center of the first image sensor 11A in the right and left direction. That is, the upper portion of FIG. 4 illustrates a construction equivalent to the FB unit 3A. The lower portion of FIG. 4 illustrates a construction in which the light receiver 35 is disposed to the left of the center of the first image sensor 11A in the right and left direction, and the support shaft 37 is disposed to the right of the center of the first image sensor 11A in the right and left direction. That is, the lower portion of FIG. 4 illustrates a construction different from the FB unit 3A. In the constructions illustrated in FIG. 4, areas B1, B2 of movement of the carriage 15 are set such that the first image sensor 11A is capable of performing image reading within the same area A1. As revealed when comparing the areas B1, B2 of movement of the carriage 15 with each other, employment of the construction equivalent to the FB unit 3A enables the area B1 of movement of the carriage 15 to be shifted leftward (toward the first position) when compared with the area B2 of movement of the carriage 15.

Here, the conveyor 20 (see FIG. 2) is provided above a left portion of the FB unit 3A. Thus, a left end position of the MFP 1 is determined by the position of the conveyor 20. Accordingly, even if only a left end of the FB unit 3A is shifted rightward, it is impossible to reduce the dimension of the MFP 1 in the right and left direction. Therefore, the necessity for shifting only the left end of the FB unit 3A rightward is low, making it easier for a space for movement of the carriage 15 and other components to be formed in a left end portion of the FB unit 3A. On the other hand, a right end position of the MFP 1 is determined by a right end position of the FB unit 3A. Thus, if a leftward shift of the right end of the FB unit 3A is possible, the dimension of the MFP 1 in the right and left direction can be reduced. However, the leftward shift of the right end of the FB unit 3A makes it difficult for the space for movement of the carriage 15 and other components to be formed in a right end portion of the FB unit 3A. In contrast, the construction illustrated in the upper portion of FIG. 4 permits the area B1 of movement of the carriage 15 to be shifted leftward (toward the first position) when compared with the area B2 of movement of the carriage 15. This construction enables the right end of the FB unit 3A to be shifted leftward, resulting in reduction of the dimension of the MFP 1 in the right and left direction.

Figure 5A:
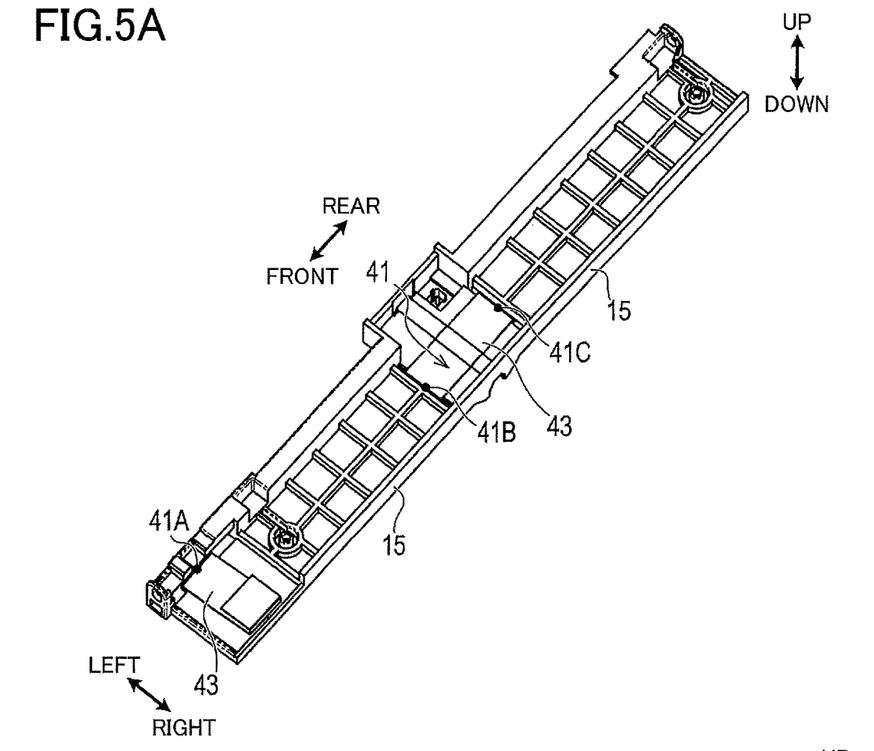
FIG. 5A is a perspective view of the carriage and a flexible flat cable in the first embodiment, viewed from an obliquely upper side of the carriage.
Figure 5B:
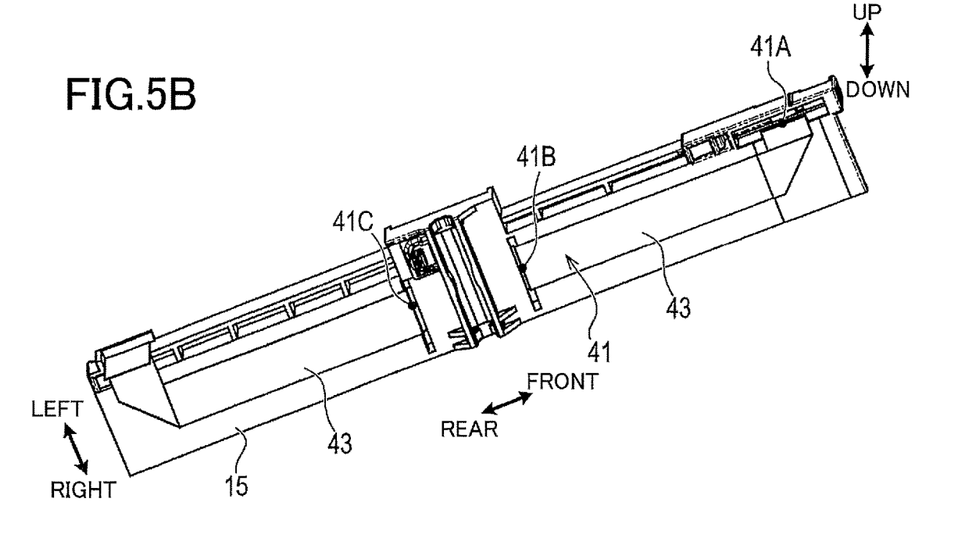
FIG. 5B is a perspective view of the carriage and the flexible flat cable in the first embodiment, viewed from an obliquely lower side of the carriage.

As illustrated in FIGS. 5A and 5B, the carriage 15 is provided with a guide 41, as one example of a guide portion, that guides a flexible flat cable (FFC) 43 as one example of a flat cable. The FFC 43 connects between the first image sensor 11A and electric mechanisms, not illustrated, of the MFP 1. One end of the FFC 43 is connected to a front end of the first image sensor 11A. The guide 41 has a first guide hole 41A, a second guide hole 41B, and a third guide hole 41C. The FFC 43 is inserted along the guide 41 through the first guide hole 41A near a front end of the carriage 15 so as to be guided by the guide 41 from an upper surface and a lower surface of the carriage 15. The guide 41 then guides the FFC 43 along the lower surface of the carriage 15 to a position near the center of the carriage 15 in the front and rear direction. The FFC 43 is then inserted along the guide 41 through the second guide hole 41B near the center of the carriage 15 in the front and rear direction so as to be guided by the second guide hole 41B from the lower surface to the upper surface of the carriage 15. The guide 41 then guides the FFC 43 to a position located at a rear of the guide shaft 14 along the upper surface of the carriage 15. At this position, the FFC 43 is inserted into the third guide hole 41C along the guide 41, whereby the guide 41 guides the FFC 43 from the upper surface to the lower surface of the carriage 15. The guide 41 then guides the FFC 43 to a position near a rear end of the carriage 15 along the lower surface of the carriage 15. At the position near the rear end of the carriage 15, the FFC 43 is separated from the carriage 15 so as to extend to a path that extends downward. Since the guide 41 guides the FFC 43 as described above, it is possible to run the FFC 43 neatly even in the case where the first image sensor 11A and the FFC 43 are connected to each other near the front end of the carriage 15, and a path for arrangement of the FFC 43 to the electric mechanisms of the MFP 1 is located near the rear end of the carriage 15.

Figure 6A:
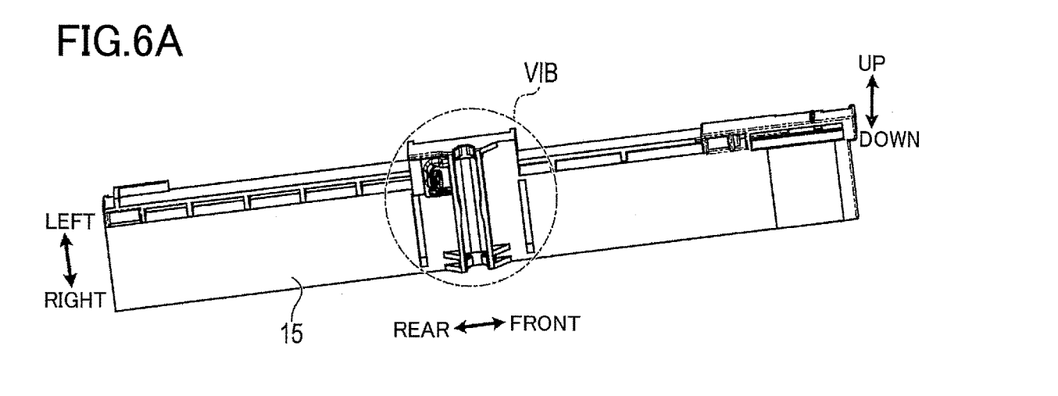
FIG. 6A is a perspective view of the carriage in the first embodiment, viewed from an obliquely lower side thereof.
Figure 6B:
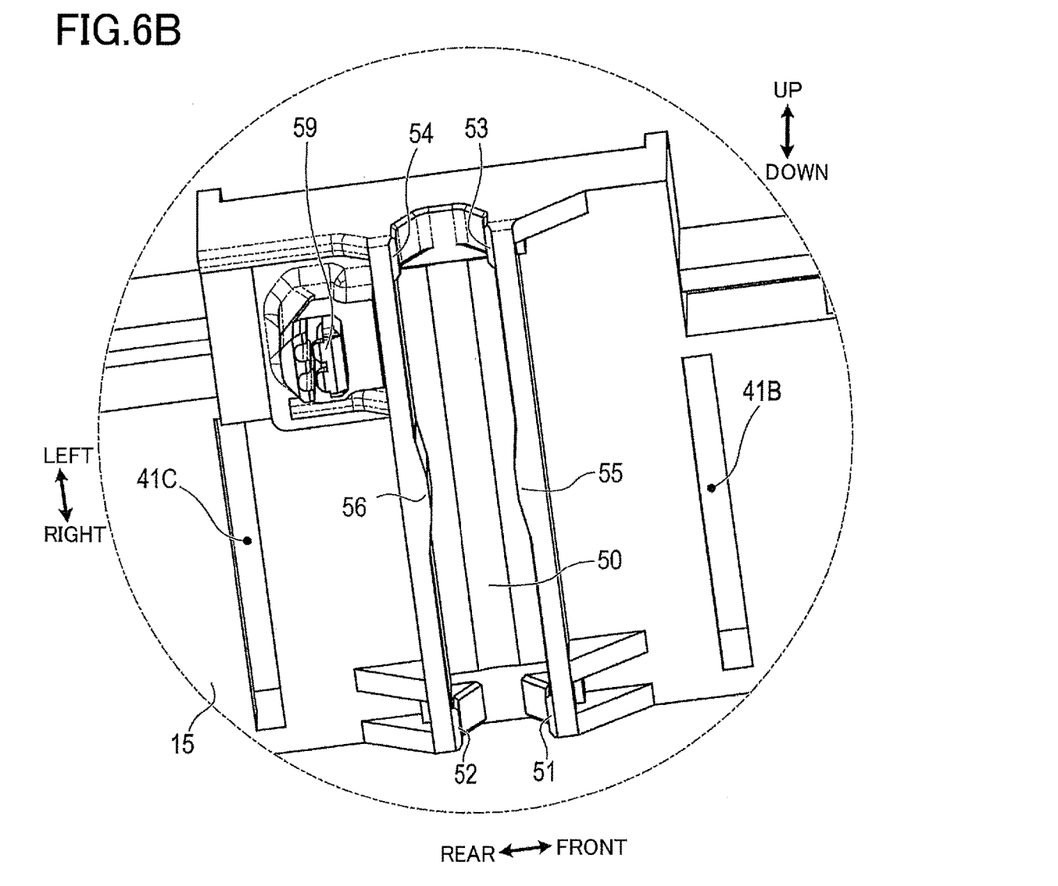
FIG. 6B is an enlarged view of area VIB indicated in FIG. 6A.
Figure 7A:
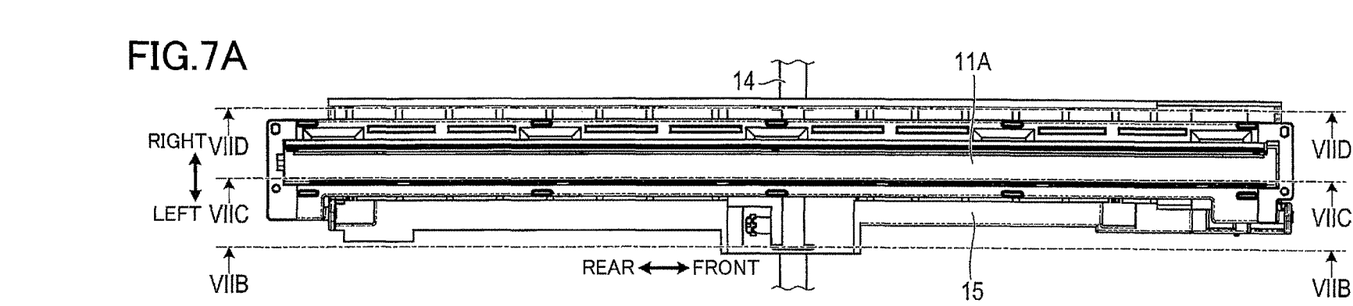
FIG. 7A is a plan view of the first image sensor and the carriage in the first embodiment.
Figure 7B:
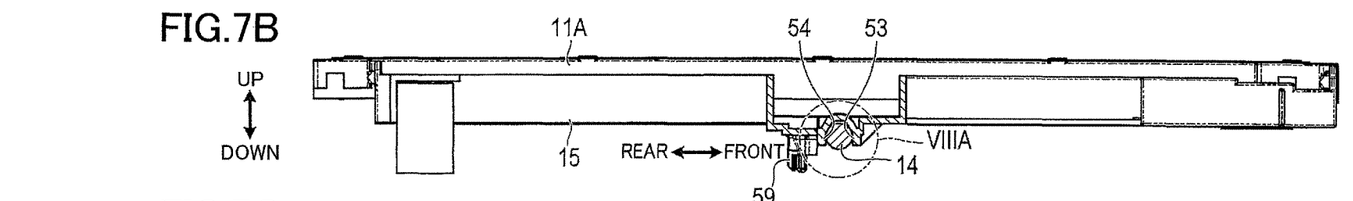
FIG. 7B is a cross-sectional view taken along line VIIB-VIIB in FIG. 7A.
Figure 7C:
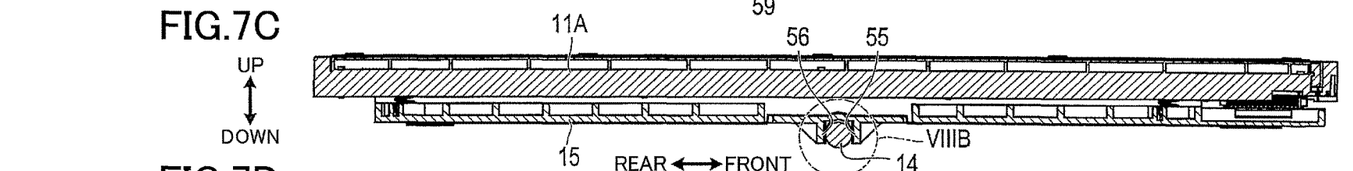
FIG. 7C is a cross-sectional view taken along line VIIC-VIIC in FIG. 7A.
Figure 7D:
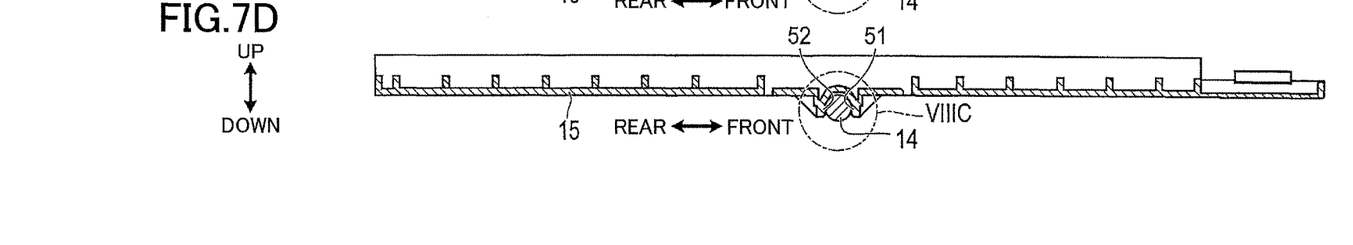
FIG. 7D is a cross-sectional view taken along line VIID-VIID in FIG. 7A.

As illustrated in FIGS. 6A and 6B, the carriage 15 has a recessed portion 50. When the carriage 15 is mounted on the guide shaft 14, at least a portion of the guide shaft 14 is located in the recessed portion 50. A first protrusion 51 and a second protrusion 52 each protruding toward the guide shaft 14 are provided on one of opposite ends (a right end) of the recessed portion 50 in the right and left direction. A third protrusion 53 and a fourth protrusion 54 each protruding toward the guide shaft 14 are provided on the other end (a left end) of the recessed portion 50. The first protrusion 51 and the second protrusion 52 are opposed to each other, with the guide shaft 14 interposed therebetween. The third protrusion 53 and the fourth protrusion 54 are opposed to each other, with the guide shaft 14 interposed therebetween.

A fifth protrusion 55 protruding toward the guide shaft 14 is provided on the recessed portion 50 at a position between the first protrusion 51 and the third protrusion 53. A sixth protrusion 56 protruding toward the guide shaft 14 is provided on the recessed portion 50 at a position between the second protrusion 52 and the fourth protrusion 54. The fifth protrusion 55 and the sixth protrusion 56 are opposed to each other, with the guide shaft 14 interposed therebetween. The carriage 15 has an attached portion 59 attached to the toothed belt 16. The attached portion 59 is located nearer to the first position than the center of the first image sensor 11A in the right and left direction, that is, the attached portion 59 is located to the left of the center of the first image sensor 11A in the right and left direction.

Figure 8A:
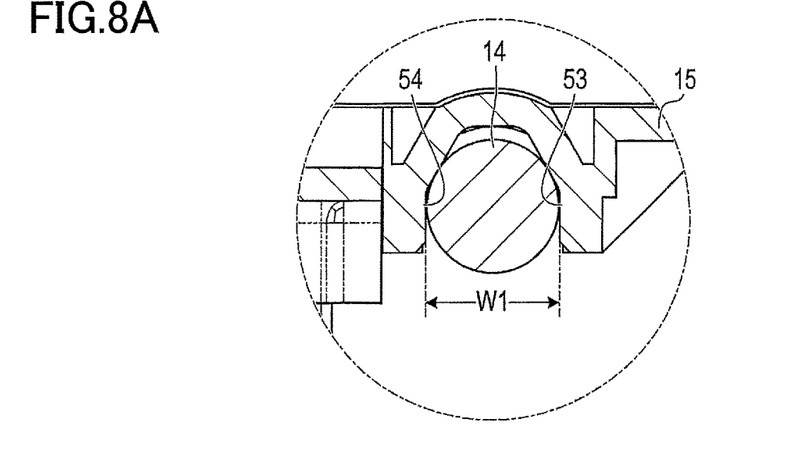
FIG. 8A is an enlarged view of area XIIIA indicated in FIG. 7B.
Figure 8B:
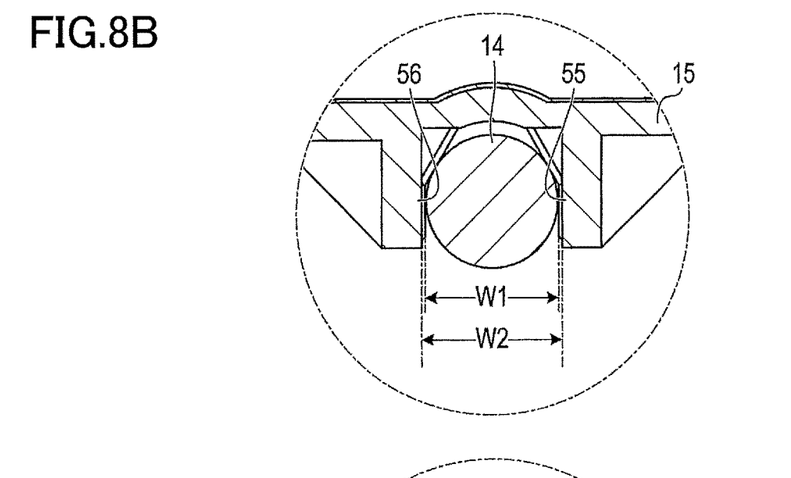
FIG. 8B is an enlarged view of area XIIIB indicated in FIG. 7C.
Figure 8C:
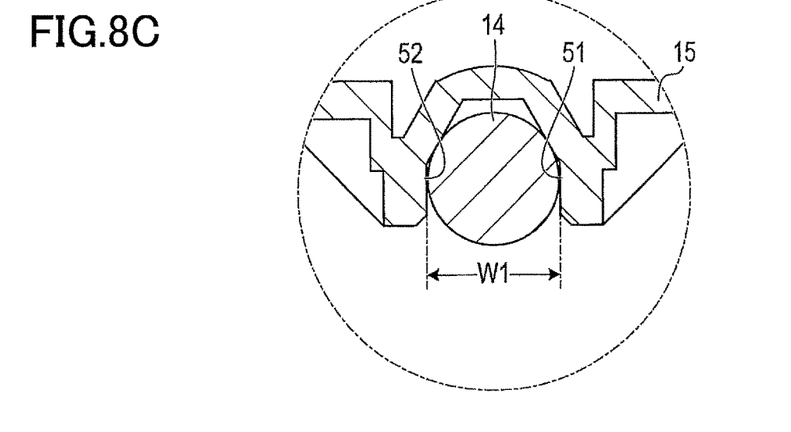
FIG. 8C is an enlarged view of XIIIC indicated in FIG. 7D.

As illustrated in FIGS. 7A-7D, when the carriage 15 is mounted on the guide shaft 14, each of the first protrusion 51, the second protrusion 52, the third protrusion 53, and the fourth protrusion 54 is in contact with the guide shaft 14 at a distal end portion of each protrusion in a direction in which the protrusion protrudes. It is noted that the direction in which the protrusion protrudes may be hereinafter referred to as "protruding direction". More specifically, as illustrated in FIG. 8C, each of the first protrusion 51 and the second protrusion 52 extends toward the guide shaft 14, and a distance W1 between respective distal ends of the first protrusion 51 and the second protrusion 52 in their respective protruding directions is substantially equal to the outside diameter of the guide shaft 14. As illustrated in FIG. 8A, each of the third protrusion 53 and the fourth protrusion 54 extends toward the guide shaft 14, and the distance W1 between respective distal ends of the third protrusion 53 and the fourth protrusion 54 in their respective protruding directions is substantially equal to the outside diameter of the guide shaft 14. That is, the distance W1 between respective the respective distal ends of the third protrusion 53 and the fourth protrusion 54 in their respective protruding directions is equal to the distance W1 between the respective distal ends of the first protrusion 51 and the second protrusion 52 in their respective protruding directions.

Each of the fifth protrusion 55 and the sixth protrusion 56 is shaped such that its protruding amount, i.e., its length, in the protruding direction is less than that of each of the first protrusion 51, the second protrusion 52, the third protrusion 53, and the fourth protrusion 54. Specifically, as illustrated in FIG. 8B, each of the fifth protrusion 55 and the sixth protrusion 56 protrudes toward the guide shaft 14, and the protruding amount of each of the fifth protrusion 55 and the sixth protrusion 56 is less than that of each of the first protrusion 51, the second protrusion 52, the third protrusion 53, and the fourth protrusion 54. Thus, the distance W2 between respective distal ends of the fifth protrusion 55 and the sixth protrusion 56 in their respective protruding directions is slightly greater than the above-described distance W1. In the present embodiment, the distance W2 is greater than the distance W1 by about 0.3 mm.

With this construction, even when the carriage 15 is mounted on the guide shaft 14, the distal end portion of each of the fifth protrusion 55 and the sixth protrusion 56 in the protruding direction is not in contact with the guide shaft 14 in an initial state. That is, a space is formed between the fifth protrusion 55 and the guide shaft 14 in a state in which the first protrusion 51 and the third protrusion 53 are held in contact with the guide shaft 14. Also, a space is formed between the sixth protrusion 56 and the guide shaft 14 in a state in which the second protrusion 52 and the fourth protrusion 54 are held in contact with the guide shaft 14.

In the case where wear or deformation occurs in a portion of the carriage 15 which includes the first protrusion 51, the second protrusion 52, the third protrusion 53, and the fourth protrusion 54, there is a possibility that each of the fifth protrusion 55 and the sixth protrusion 56 contacts the guide shaft 14 at the distal end portion of each protrusion in the protruding direction. For example, in the case where the first protrusion 51 is worn or deformed, the space between the fifth protrusion 55 and the guide shaft 14 is narrowed in the state in which the first protrusion 51 and the third protrusion 53 are in contact with the guide shaft 14. In the case where the first protrusion 51 is further worn or deformed, the fifth protrusion 55 contacts the guide shaft 14. Likewise, in the case where the third protrusion 53 is further worn or deformed, the fifth protrusion 55 contacts the guide shaft 14. In the case where the second protrusion 52 or the fourth protrusion 54 is worn or deformed, the sixth protrusion 56 contacts the guide shaft 14. In addition, in the case where a portion of the carriage 15 which is different from the protrusions is deformed, there is a possibility that each of the fifth protrusion 55 and the sixth protrusion 56 contacts the guide shaft 14 at the distal end portion of each protrusion in the protruding direction.

Effects

In the MFP 1 described above, in the case where wear or deformation occurs in a portion of the carriage 15 which includes the first protrusion 51, the second protrusion 52, the third protrusion 53, and the fourth protrusion 54, the fifth protrusion 55 and the sixth protrusion 56 may contact the guide shaft 14. In the case where the fifth protrusion 55 and the sixth protrusion 56 contact the guide shaft 14, a force applied from the guide shaft 14 to the first protrusion 51, the second protrusion 52, the third protrusion 53, and the fourth protrusion 54 spreads to the fifth protrusion 55 and the sixth protrusion 56. This construction prevents concentration of load in any of the first protrusion 51, the second protrusion 52, the third protrusion 53, and the fourth protrusion 54, thereby preventing progress of wear or deformation of the protrusion.

Which protrusion or protrusions a load concentrates on among the first protrusion 51, the second protrusion 52, the third protrusion 53, and the fourth protrusion 54 may change depending upon a worn or deformed area and a degree of the wear or deformation. For example, in the case where a particular protrusion, e.g., the first protrusion 51, is worn, a load may concentrate on the other protrusions, e.g., the second protrusion 52, the third protrusion 53, and the fourth protrusion 54. The concentration of load on the protrusions is not limited to being caused due to the wear or deformation of the protrusion. For example, in the case where a portion of the carriage 15 which is different from the protrusions is deformed, a load may concentrate on a particular protrusion or protrusions. In either case, however, contact of the fifth protrusion 55 and the sixth protrusion 56 with the guide shaft 14 prevents concentration of a load on a particular protrusion or protrusions.

Also, the fifth protrusion 55 and the sixth protrusion 56 are not in contact with the guide shaft 14 in the initial state. Thus, in a state in which wear or deformation is not caused in a portion of the carriage 15 which includes the first protrusion 51, the second protrusion 52, the third protrusion 53, and the fourth protrusion 54, the carriage 15 is smoothly moved in the right and left direction without frictional resistance between the guide shaft 14 and each of the fifth protrusion 55 and the sixth protrusion 56.

In the present embodiment, the reading elements of the first image sensor 11A are arranged at the respective positions that are nearer to the second position than the center of the first image sensor 11A in the right and left direction. Also, the first image sensor 11A is supported by the carriage 15 so as to be pivotable about the axis R1 extending in the front and rear direction at the position nearer to the first position than the center of the first image sensor 11A in the right and left direction.

With this construction, when compared with a construction in which the reading elements are arranged at positions located nearer to the first position than the center of the first image sensor 11A in the right and left direction, the area of movement of the carriage 15 may be shifted toward the first position even when the areas of reading of the first image sensor 11A in these two constructions are the same in the right and left direction. In the case where a space generated near the second position by this shift is not necessary, this space may be eliminated to reduce the dimension of the MFP 1 in the right and left direction, resulting in smaller size of the MFP 1.

In the present embodiment, the attached portion 59 is provided at the position that is nearer to the first position than the center of the first image sensor 11A in the right and left direction. With this construction, when compared with a construction in which the attached portion 59 is provided at a position nearer to the second position than the center of the first image sensor 11A in the right and left direction, the area on which the toothed belt 16 is provided may be shifted toward the first position even when the areas of reading of the first image sensor 11A in these two constructions are the same in the right and left direction. In this case, a space is generated near the second position by the shift. In the case where this space is not necessary, the space may be eliminated to reduce the dimension of the MFP 1 in the right and left direction, resulting in smaller size of the MFP 1. It is noted that there is a sufficient space at a portion of the FB unit 3A near the first position because the ADF unit 3B is provided over the portion of the FB unit 3A. Thus, even in the case where the area on which the toothed belt 16 is provided is shifted toward the first position, there is no effect on the width of the MFP 1 in the right and left direction.

In the present embodiment, the guide 41 is provided on the carriage 15, making it possible to run the FFC 43 neatly.

Second Embodiment

There will be next explained a second embodiment, focusing on a difference between the second embodiment and the first embodiment. It is noted that the same reference numerals as used in the first embodiment are used to designate the corresponding elements of the second embodiment, and an explanation of which is dispensed with.

Figure 9:
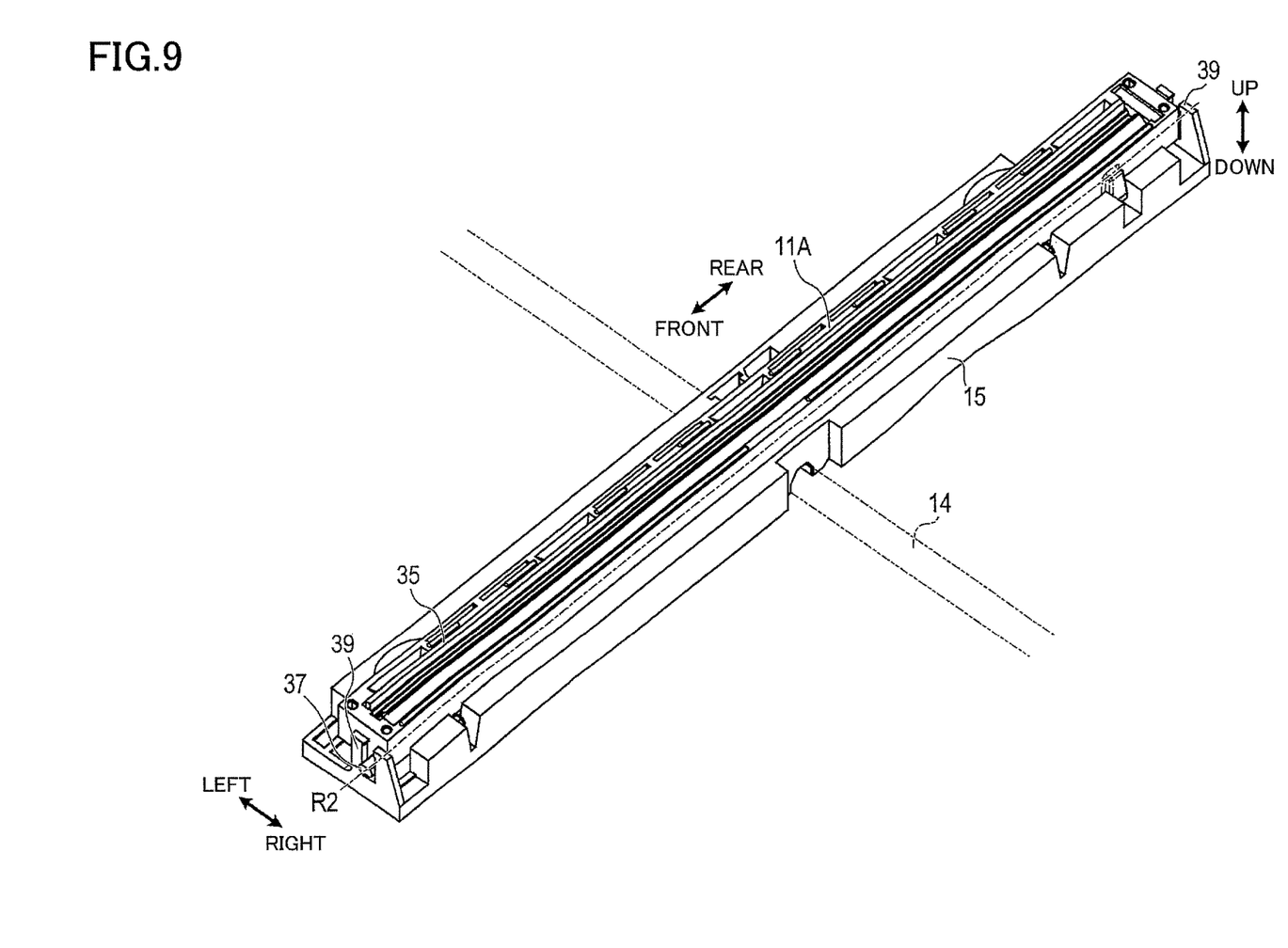
FIG. 9 is a perspective view of a first image sensor and a carriage in a second embodiment.

As illustrated in FIG. 9, the second embodiment is different from the first embodiment in a positional relationship between the light receiver 35 and an axis R2 about which the first image sensor 11A is pivoted. In the second embodiment, specifically, the first image sensor 11A includes the light receiver 35 located to the left of the center of the first image sensor 11A in the right and left direction. That is, the light receiver 35 is disposed nearer to the first position than the center of the first image sensor 11A in the right and left direction. The reading elements are arranged just under the light receiver 35.

The first image sensor 11A includes the support shaft 37 located to the right of the center of the first image sensor 11A in the right and left direction. That is, the support shaft 37 is disposed nearer to the second position than the center of the first image sensor 11A in the right and left direction. The support shaft 37 is supported by the bearing 39 provided on the carriage 15. With this construction, the first image sensor 11A is supported by the carriage 15 so as to be pivotable about the axis R2 extending in the front and rear direction at the position located to the right of the center of the first image sensor 11A in the right and left direction.

Figure 10A:
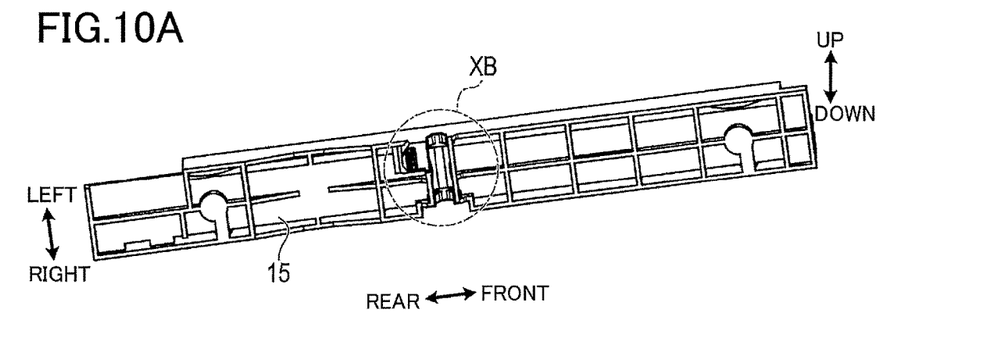
FIG. 10A is a perspective view of the carriage in the second embodiment, viewed from an obliquely lower side thereof.
Figure 10B:
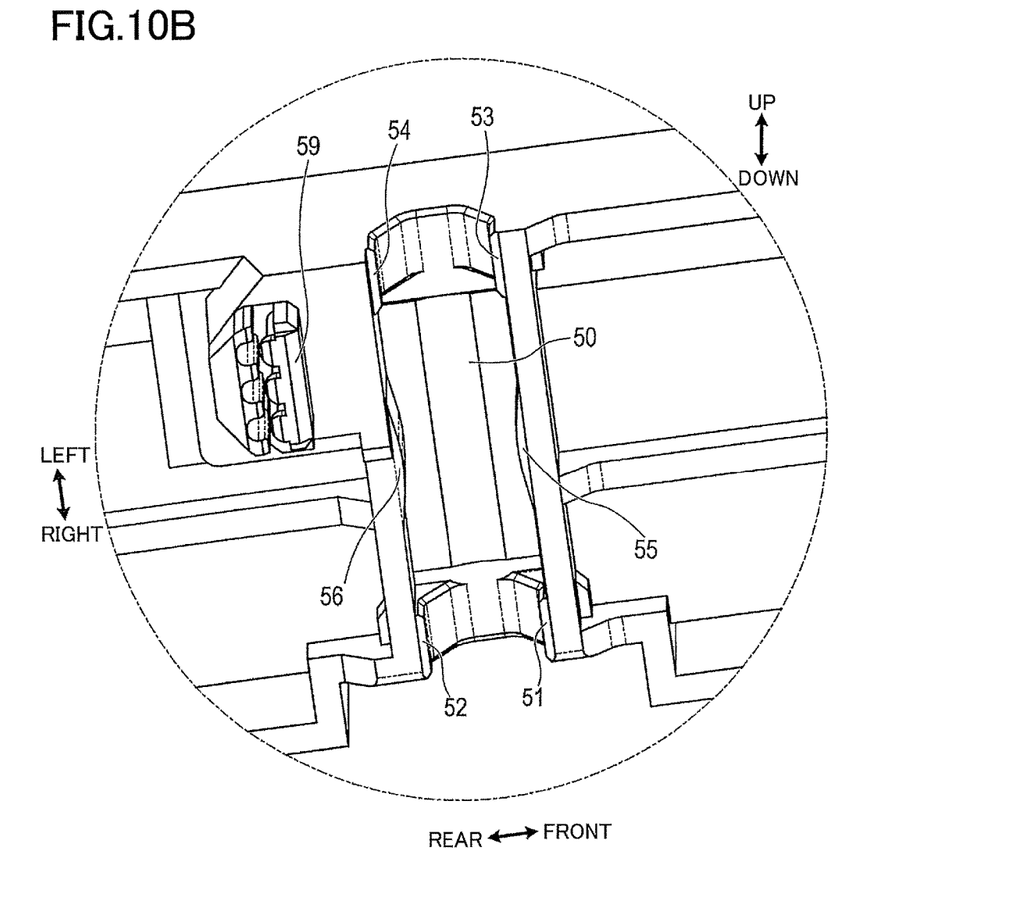
FIG. 10B is an enlarged view of area XB indicated in FIG. 10A.
Figure 11A:
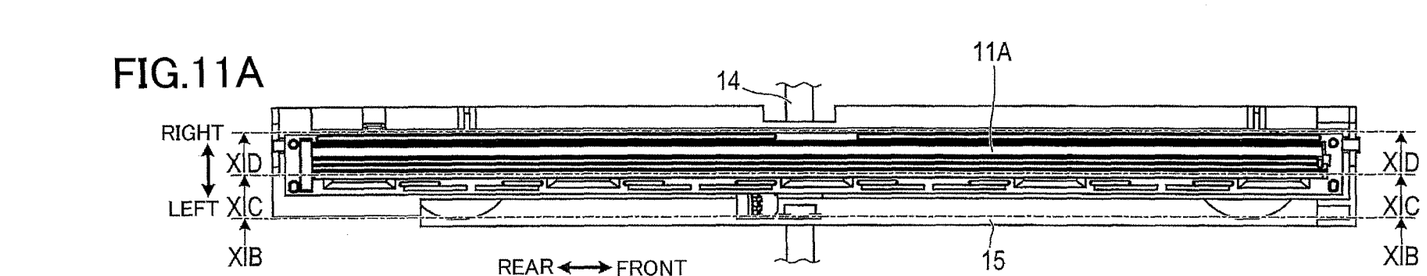
FIG. 11A is a plan view of the first image sensor and the carriage in the second embodiment.
Figures 11B, 11C:
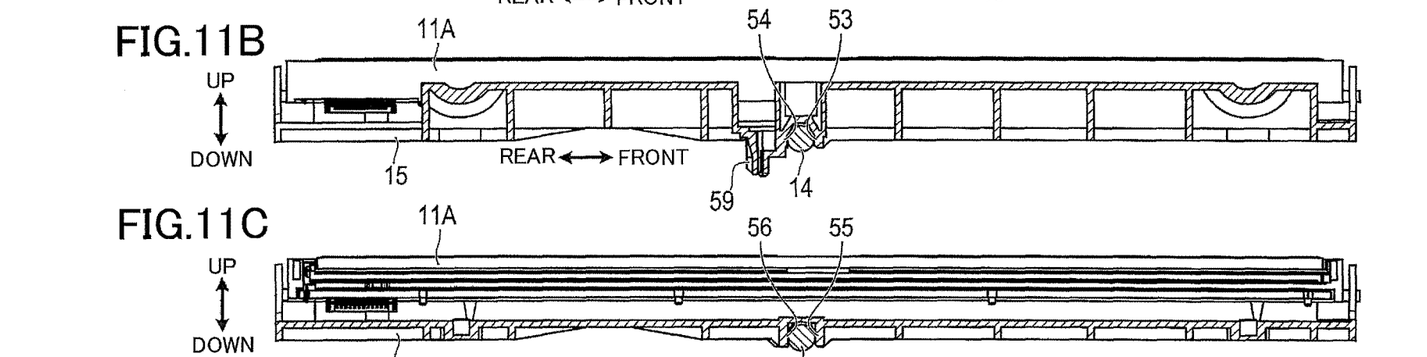
FIG. 11B is a cross-sectional view taken along line XIB-XIB in FIG. 11A.
FIG. 11C is a cross-sectional view taken along line XIC-XIC in FIG. 11A.
Figure 11D:
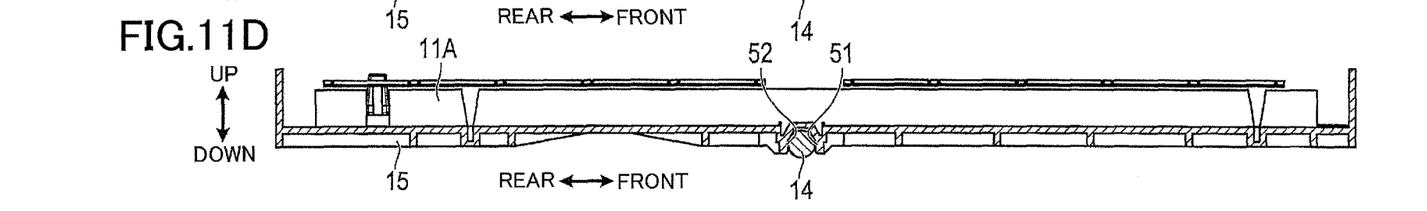
FIG. 11D is a cross-sectional view taken along line XID-XID in FIG. 11A.

As illustrated in FIGS. 10A and 10B, the carriage 15 in the second embodiment has the recessed portion 50 as in the first embodiment. The first protrusion 51 and the second protrusion 52 each protruding toward the guide shaft 14 are provided on one of opposite ends (the right end) of the recessed portion 50 in the right and left direction. The third protrusion 53 and the fourth protrusion 54 each protruding toward the guide shaft 14 are provided on the other end (the left end) of the recessed portion 50.

The fifth protrusion 55 protruding toward the guide shaft 14 is provided on the recessed portion 50 at a position between the first protrusion 51 and the third protrusion 53. The sixth protrusion 56 protruding toward the guide shaft 14 is provided on the recessed portion 50 at a position between the second protrusion 52 and the fourth protrusion 54. The carriage 15 has the attached portion 59 attached to the toothed belt 16. The attached portion 59 is located nearer to the first position than the center of the first image sensor 11A in the right and left direction, that is, the attached portion 59 is located to the left of the center of the first image sensor 11A in the right and left direction.

As illustrated in FIGS. 11A-11D, when the carriage 15 is mounted on the guide shaft 14, each of the first protrusion 51, the second protrusion 52, the third protrusion 53, and the fourth protrusion 54 is in contact with the guide shaft 14 at the distal end portion of each protrusion in the protruding direction. Each of the fifth protrusion 55 and the sixth protrusion 56 is shaped such that its protruding amount in the protruding direction is less than that of each of the first protrusion 51, the second protrusion 52, the third protrusion 53, and the fourth protrusion 54. With this construction, even when the carriage 15 is mounted on the guide shaft 14, the distal end portion of each of the fifth protrusion 55 and the sixth protrusion 56 in the protruding direction is not in contact with the guide shaft 14 in the initial state. In the case where wear or deformation occurs in a portion of the carriage 15 which includes the first protrusion 51, the second protrusion 52, the third protrusion 53, and the fourth protrusion 54, there is a possibility that each of the fifth protrusion 55 and the sixth protrusion 56 contacts the guide shaft 14 at the distal end portion of each protrusion in the protruding direction.

Effects

As in the first embodiment, the MFP 1 according to the second embodiment includes the first protrusion 51, the second protrusion 52, the third protrusion 53, the fourth protrusion 54, the fifth protrusion 55, and the sixth protrusion 56. This construction prevents concentration of load in any of the first protrusion 51, the second protrusion 52, the third protrusion 53, and the fourth protrusion 54, thereby preventing progress of wear or deformation of the protrusion. Also, the fifth protrusion 55 and the sixth protrusion 56 are not in contact with the guide shaft 14 in the initial state. Thus, in a state in which wear or deformation is not caused in a portion of the carriage 15, the carriage 15 is smoothly moved in the right and left direction.

In this second embodiment, the axis about which the first image sensor 11A is pivoted is located nearer to the second position than the center of the first image sensor 11A in the right and left direction. With this construction, the reading elements of the first image sensor 11A are arranged so as to be pulled by the carriage 15. Accordingly, even when a force generated by contact with the FB platen 12 transfers to the first image sensor 11A, a positional relationship between the FB platen 12 and each of the reading elements of the first image sensor 11A is easily made steady, resulting in increase in quality of image read by the first image sensor 11A.

Alternative Embodiments

While the embodiments have been described above, it is to be understood that the disclosure is not limited to the details of the illustrated embodiments, but may be embodied with various changes and modifications, which may occur to those skilled in the art, without departing from the spirit and scope of the disclosure.

For example, the attached portion 59 is provided nearer to the first position than the center of the first image sensor 11A in the right and left direction in the above-described embodiment. That is, the attached portion 59 is located to the left of the center of the first image sensor 11A in the right and left direction. However, the attached portion 59 may be provided nearer to the second position than the center of the first image sensor 11A in the right and left direction. That is, the attached portion 59 may be located to the right of the center of the first image sensor 11A in the right and left direction.

The guide 41 is provided on the carriage 15 in the above-described embodiment but may not be provided. A plurality of components may cooperate to achieve a particular function achieved by one component in the above-described embodiments. Also, one component may achieve a plurality of functions of a plurality of components or a particular function achieved by a plurality of components in the above-described embodiments. The construction in the above-described embodiments may be partly omitted. At least a portion of the construction in one of the above-described embodiments may be added to or replaced with a construction in another of the above-described embodiments, for example. The present disclosure may be applied not only to the image reading apparatus but also to a system including the image reading apparatus, for example.

What is claimed is:
1. An image reading apparatus, comprising:
a document supporter comprising a support surface parallel with a first direction and a second direction orthogonal to each other, the support surface being configured to support a document;
a guide spaced apart from the document supporter and extending in the second direction;
a carriage reciprocable in the second direction along the guide within an area extending from a first position to a second position; and
a reader mounted on the carriage and movable in the second direction with the carriage, the reader comprising a plurality of reading elements arranged in the first direction, the plurality of reading elements being configured to read an image formed on the document supported on the document supporter during movement of the reader in the second direction,
wherein the carriage comprises a recessed portion in which at least a portion of the guide is located when the carriage is mounted on the guide,
wherein a first protrusion and a second protrusion each protruding toward the guide are provided on a first end portion of opposite end portions of the recessed portion in the second direction,
wherein a third protrusion and a fourth protrusion each protruding toward the guide are provided on a second end portion of the opposite end portions of the recessed portion in the second direction, wherein a fifth protrusion protruding toward the guide is provided on the recessed portion at a position between the first protrusion and the third protrusion, wherein a sixth protrusion protruding toward the guide is provided on the recessed portion at a position between the second protrusion and the fourth protrusion, wherein each of the first protrusion, the second protrusion, the third protrusion, and the fourth protrusion comprises a distal end portion in a protruding direction thereof, and the distal end portion is in contact with the guide when the carriage is mounted on the guide, wherein a protruding amount of each of the fifth protrusion and the sixth protrusion in a protruding direction thereof is less than that of each of the first protrusion, the second protrusion, the third protrusion, and the fourth protrusion.

2. The image reading apparatus according to claim 1, wherein a distance between a distal end portion of the fifth protrusion in a protruding direction thereof and a distal end portion of the sixth protrusion in a protruding direction thereof is less than each of (i) a distance between the distal end portion of the first protrusion in the protruding direction thereof and the distal end portion of the second protrusion in the protruding direction thereof and (ii) a distance between the distal end portion of the third protrusion in the protruding direction thereof and the distal end portion of the fourth protrusion in the protruding direction thereof.

3. The image reading apparatus according to claim 1, wherein the reader is configured to read the image formed on the document supported by the document supporter when the carriage is moved from the first position toward the second position, and wherein the reader comprises a reading element disposed nearer to the second position than a central position of the reader in the second direction, and the reader is supported by the carriage so as to be pivotable about an axis extending in the first direction at a position nearer to the first position than the central position of the reader.

4. The image reading apparatus according to claim 1, wherein the reader is configured to read the image formed on the document supported by the document supporter when the carriage is moved from the first position toward the second position, and wherein the reader comprises a reading element disposed nearer to the first position than a central position of the reader in the second direction, and the reader is supported by the carriage so as to be pivotable about an axis extending in the first direction at a position nearer to the second position than the central position of the reader.

5. The image reading apparatus according to claim 1, further comprising a looped belt rotatable in a forward direction and a reverse direction, wherein the carriage comprises an attached portion attached to the looped belt, and wherein the attached portion is located nearer to the first position than a central position of the reader in the second direction.

6. The image reading apparatus according to claim 1, wherein the reader and each of a plurality of electric mechanisms provided in a body of the image reading apparatus are connected to each other by a flat cable, and wherein the carriage is provided with a guide portion that guides the flat cable from a first end to a second end of the carriage in the first direction.

7. The image reading apparatus according to claim 1, further comprising a conveyor configured to convey the document along a conveyance path, wherein the reader is configured to read the image formed on the document conveyed by the conveyor, and wherein the first position overlaps the conveyor, and the second position does not overlap the conveyor when viewed in a third direction orthogonal to each of the first direction and the second direction.

* * * * *